UNITED STATES PATENT OFFICE.

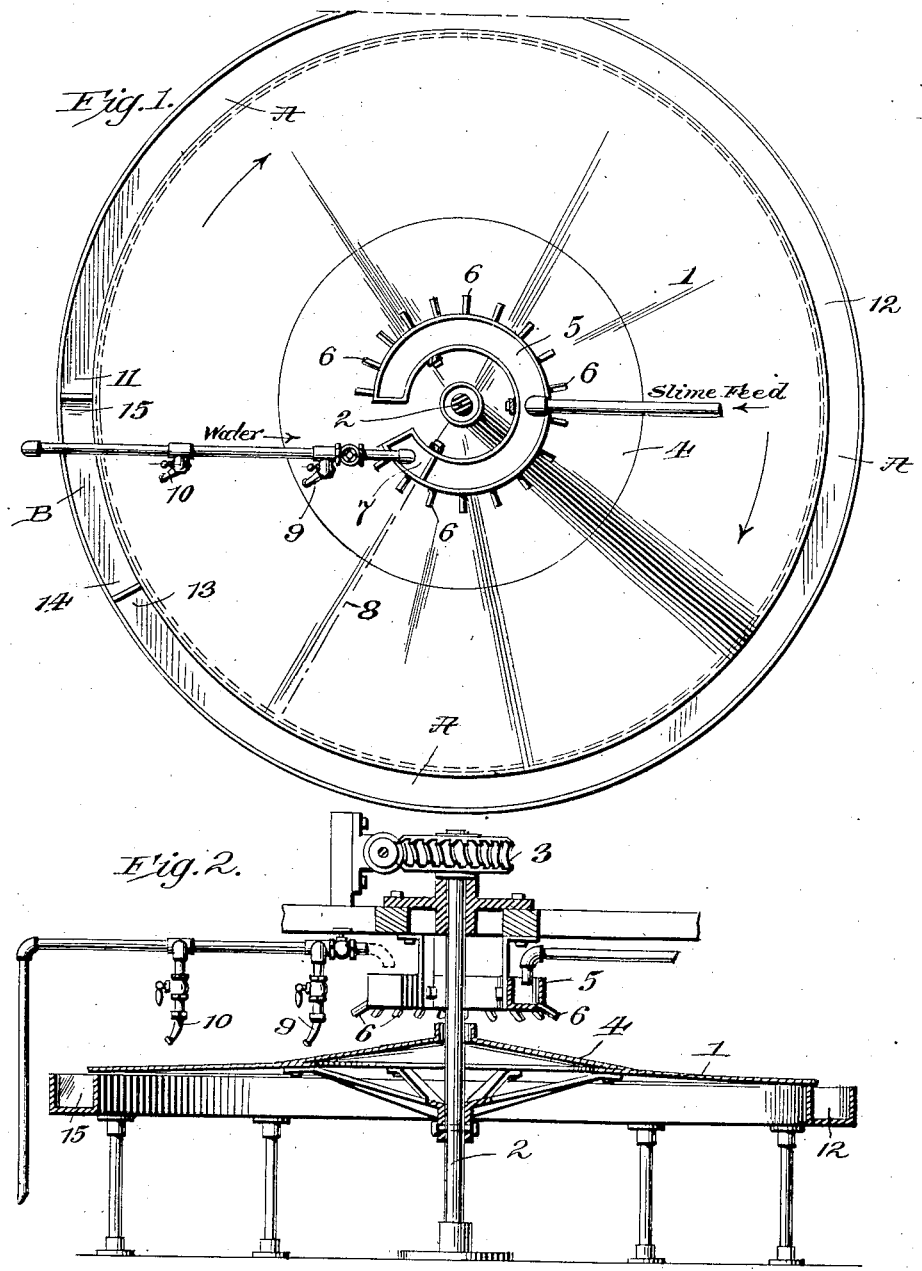

ROBERT H. RICHARDS, OF JAMAICA PLAIN, MASSACHUSETTS.

METHOD OF CONCENTRATING ORES.

1,359,105.          Specification of Letters Patent.    Patented Nov. 16, 1920.

Application filed May 8, 1919. Serial No. 295,721.

*To all whom it may concern:*

Be it known that I, ROBERT H. RICHARDS, a citizen of the United States, residing at Jamaica Plain, in the county of Suffolk and State of Massachusetts, have invented certain new and useful Improvements in Methods of Concentrating Ores, of which the following is a specification.

This invention relates to a method or art of concentrating mineral ores, and particularly to the concentration of that class of prepared ores known as slimes.

Although the term "slimes" is used in different parts of the country to designate somewhat different materials, the word is here used in its general sense, and may be defined for the purpose of the present description as any finely comminuted ore which when mixed with or suspended in water, forms a relatively slow-settling mixture characterized by the presence of extremely finely divided material commonly known in the art as colloids. In addition to the colloids, the slimes contain coarser granular material which is a mixture of mineral values and gangue. The principal mineral value of slime ores may be found in the granular portions thereof, while there may or may not be metallic values found in the colloids, and the presence of colloids exerts such a harmful effect in the concentration of the granular material by the processes which depend on settling in water, that the elimination of the colloids is often desirable whether or not their metallic content is to be saved by some further treatment. In fact, the treatment of slime ores has been accompanied by the very greatest difficulty.

One of the common methods of treating slime ores, such for example as the overflow from various types of settling tanks, has been to feed such ore to some type of round table or other inclined settling surface, the function of the round table or kindred device being to effect a separation of the colloids together with the granular gangue, from the granular metallic values. In other words, the round table was so designed and operated that the colloids and the granular gangue flowed away as tailings, leaving the granular metallic values behind as concentrates. This action is characteristic of the tables in common use, and in such tables the customary inclination of the concentrating surface is about one and three-eighths inches, more or less, to the foot. While these tables operate to effect a fairly good separation along the line mentioned, there is a very considerable loss of granular metallic values which are carried off the table with the tailings. This loss is partly due to the fact that the flow of the slime over the table is sufficiently rapid to keep certain of the valuable granular material in suspension with the gangue particles in the slime, and partly due to the fact that the flow is sufficiently rapid to draw down the table some of the metallic ore particles which have been precipitated, which suspended particles then go over into the tailings.

I have discovered by experiment that if the inclination of the concentrating surface of such a table be progressively reduced there is a progressively increasing tendency for all the granular material, both gangue and metallic values, to remain on the table, while there is no noticeable increasing tendency for the colloids to remain there. If the inclination of the concentrating surface be sufficiently reduced, a point is reached at which only the colloids flow, practically all of the granular material, both gangue and metallic values, remaining together on the table freed of colloids. The precipitation of the granular material takes place relatively quickly and completely, and once the granular material has reached the concentrating surface it has little or no forward movement thereover.

The above considerations have led me to devise a method of concentration characterized by the initial separation of the colloids from the granular material upon a very slightly inclined concentrating surface. This concentrating surface may be the conical surface of a round table, or a plane surface, or any other suitable concentrating surface capable of the proper slight inclination. In practising my process or method I feed relatively dilute slime in an extremely thin or shallow stream to a concentrating surface having an inclination which may be one-half inch to the foot, although I do not confine myself to that slope, and by the flow of the slime down this surface I effect in the manner above outlined, the separation of the colloids from the grannular material, the granular material being quickly precipitated upon the concentrating surface while the colloids flow away. The granular materials once free of colloids are available for further ready treatment to concentrate the metallic values.

The best inclination for the concentrating surface is to a certain degree dependent upon the nature of the ore, and may be varied accordingly. The proper degree of dilution of the slime is dependent upon the nature of the ore, the rate of feed, and the inclination of the concentrating table. It can readily be determined by trial, due regard being had for the fact that the rapidity of precipitation of the granular particles increases with the degree of dilution of the slime, and that the dilution should be such as to permit the complete or substantially complete precipitation of the granular material during the flow down the table. Once precipitated into contact with the concentrating surface, the granular material has little or no tendency to forward motion.

The general principle of my invention being now understood, I shall describe it as practised on a round table, though this is only one of the devices available for use in carrying out the process. In the drawings:—

Figure 1 is a plan view of the round table used in my process; and

Fig. 2 is an elevation thereof, mainly in section.

In the drawing, which is largely diagrammatic, 1 represents a conical concentrating table having an inclination of about ½ inch per foot, this being an inclination suited to the treatment by my process of some ores. The table is fast on a vertical shaft 2, and is driven at a slow rate in the direction of the arrow by a worm and wheel 3. A rotary conical distributer 4 forms or occupies the central part of the table 1, to which the pulp is fed by a concentric feed trough 5 with delivery nozzles 6. The pulp is fed from the distributer 4 to the table 1 by flowing it down over a circular arc of 300° more or less of the distributer 4 and the trough 5. In case the pulp as fed to the distributer is not sufficiently dilute, additional water may be furnished. When the pulp reaches the point 8 in the slow revolution of the table it no longer receives a feed of pulp from distributer 4, but instead receives clean wash water from a compartment 7 of the concentric feed trough. This wash water removes the last of the colloids, leaving the granular portion free to be washed off the table by the two wash-off jets 9 and 10. As a result of this operation the colloids will be caught in the concentric receiving launder 11—12—13 over an angle of 330° more or less, and the granular portion will be caught in the concentric trough 14—15 covering an angle of 30° of arc, more or less. The concentric receiving launders may be divided by movable partitions at the two points 14—13 and 11—15, so as to permit the delivery of the colloids into 11—12—13 and the granular portion into 14—15. Also the partition between the two compartments of the concentric feed trough 5 and 7 may be movable to better control the process. Additional spray pipes may likewise be used as is customary on round tables, if it is found desirable.

The process is a continuous one as carried out on the round table described. Water is supplied at the proper rate and slime is fed to the distributer. From this it flows down over the table in a thin shallow stream, precipitating the granular material. The colloids flow over the edge of the table and into the portion of the launder marked A. The granular material remains on the surface of the table until sprayed off by the two jets 9 and 10 into the portion of the launder marked B.

Any other type of round table having the proper inclination may be used in a similar manner. The process may also be carried out on other slightly inclined concentrating surfaces.

Having thus described my invention what I claim is:—

1. The method of separating granular material from the colloid material in slimes, which consists in feeding such slime in a relatively dilute condition in a shallow stream to a concentrating surface inclined sufficiently to cause the forward movement of the colloids but insufficiently to permit a substantial forward movement of precipitated granular material.

2. The method of separating granular material from the colloid material in slimes, which consists in continuously feeding a slime in a relatively dilute condition in a shallow stream to a concentrating surface inclined sufficiently to cause the forward movement of the colloids but not sufficiently inclined to permit a substantial forward movement of the precipitated granular material; and continuously removing the precipitated granular material.

3. The method of separating granular material from the colloid material in slimes, which consists in feeding such slimes in a relatively dilute condition in a shallow stream to a horizontally-moving concentrating surface inclined sufficiently to cause the off-flow of the colloids and not inclined sufficiently to permit a substantial flowing movement of precipitated granular material therewith; and then removing said granular material from the concentrating surface at a point in the path of the concentrating surface beyond the point of supply of slime thereto and after the off-flow of the colloid material.

4. The method of concentrating the mineral values contained in slimes composed of mixtures of granular and colloid materials, which consists in flowing said slime over a slightly inclined concentrating surface to effect a precipitation of the granular material from the off-flowing colloid material; and then treating the precipitated granular material to concentrate the mineral values contained therein.

In testimony whereof I have signed my name to this specification.

ROBERT H. RICHARDS.